(12) United States Patent
Matsumura

(10) Patent No.: US 12,614,900 B2
(45) Date of Patent: Apr. 28, 2026

(54) POWER DISTRIBUTION BOX HAVING A BRACKET

(71) Applicant: Sumitomo Wiring Systems, Ltd., Yokkaichi (JP)

(72) Inventor: Max Matsumura, Farmington Hills, MI (US)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 141 days.

(21) Appl. No.: 18/486,380

(22) Filed: Oct. 13, 2023

(65) Prior Publication Data

US 2025/0125601 A1 Apr. 17, 2025

(51) Int. Cl.
| | |
|---|---|
| *H02G 3/00* | (2006.01) |
| *H02G 3/08* | (2006.01) |
| *H02G 3/10* | (2006.01) |
| *B60R 16/02* | (2006.01) |
| *F16M 13/02* | (2006.01) |

(52) U.S. Cl.
CPC .............. *H02G 3/10* (2013.01); *H02G 3/081* (2013.01); *B60R 16/02* (2013.01); *F16M 13/02* (2013.01)

(58) Field of Classification Search
CPC .......... H02G 3/10; H02G 3/081; B60R 16/02; F16M 13/02
See application file for complete search history.

(56) References Cited

U.S. PATENT DOCUMENTS

| | | | |
|---|---|---|---|
| 6,291,767 B1 | 9/2001 | Beecher, II et al. | |
| 7,154,040 B1 | 12/2006 | Tompkins | |
| 9,502,793 B2 * | 11/2016 | Iwata ..................... | H01R 9/223 |
| 2007/0123114 A1 * | 5/2007 | Egawa ................... | H01R 11/12 |
| | | | 439/752 |
| 2017/0072802 A1 * | 3/2017 | Matsumura ............... | B60L 1/00 |
| 2017/0148600 A1 * | 5/2017 | Carnick ............. | H01H 85/0241 |

FOREIGN PATENT DOCUMENTS

| | | |
|---|---|---|
| CN | 202797809 U | 3/2013 |
| CN | 105140796 B | 8/2018 |
| CN | 210912294 U | 7/2020 |
| CN | 218431123 U | 2/2023 |
| CN | 218850324 U | 4/2023 |

* cited by examiner

*Primary Examiner* — Pete T Lee
(74) *Attorney, Agent, or Firm* — Brooks Kushman PC

(57) ABSTRACT

A power distribution box assembly for supporting a wire harness assembly having a connector includes a lower cover, a bracket and a clip. The lower cover includes a mounting portion having a first hole. The bracket is attached to the mounting portion and includes a second hole, a portion of the bracket is spaced apart from an outer surface of the lower cover. The clip engages the second hole of the bracket so as to attach to the connector to the bracket. The power distribution box assembly is configured to distribute power to the vehicle and provide a structure for mounting a component and mitigating the damage to the electric components housed therein due to an impact.

16 Claims, 7 Drawing Sheets

POWER DISTRIBUTION BOX HAVING A BRACKET

TECHNICAL FIELD

The present specification generally relates to a power distribution box having a bracket for receiving a load.

BACKGROUND

With reference to FIG. 1, a conventional power distribution box assembly 200 may be mounted in a vehicle (not shown). The power distribution box assembly 200 is configured to house electronic components for distributing power throughout the vehicle. In addition to providing power distribution functions, conventional power distribution box assemblies 200 are configured to provide a mounting structure for routing various components. For instance, a wire harness (not shown) may be attached to the power distribution box assembly to route wire to various areas of the vehicle. In such an aspect, the power distribution box assembly 200 includes a lower cover 202 having a wall 204. The wall includes a plurality of openings 206 to which a connector (not shown) of a wire harness may be attached thereto using conventional fasteners (not shown). However, in such an arrangement, the wall 204 of the lower cover 202 may be deformed upon impact which may damage the electronic components housed therein.

Accordingly, it remains desirable to have a power distribution box assembly that is configured to distribute power and provide a structure for mounting a component and mitigating the damage to the electric components housed therein due to an impact.

SUMMARY

A power distribution box assembly for supporting a wire harness assembly having a connector includes a lower cover, a bracket, and a clip. The lower cover includes a support wall. The support wall includes a mounting portion having a first hole. The bracket is configured to be attached to the mounting portion. The bracket includes a second hole. The clip configured to engage the second hole of the bracket so as to attach to the connector to the bracket.

In one aspect of the power distribution box assembly the lower cover includes a bottom support wall disposed at a bottom end of the mounting portion and a recessed wall is disposed at one end of the bottom support wall opposite of the mounting portion so as to form a space between an inner surface of the bracket and the outer surface of the recessed wall. The bracket may further include a weakening portion configured to bend and the weakening portion may be disposed beneath the bottom end of the mounting portion.

In one aspect of the power distribution box assembly, the lower cover includes a first side wall, a second side wall, a third side wall, a fourth side wall and a bottom wall connected to each other to define an open top. In such an aspect, the mounting portion may be disposed between one of the first side wall, the second side wall, the third side wall, and the fourth side wall.

In one aspect of the power distribution box assembly, the mounting portion includes a planar surface extending from the bottom end to a top end. In such an aspect, the bracket includes an attachment hole for receiving a clip to attach the connector. The bracket may further include a support arm. The support arm may extend orthogonal from an inner surface of the bracket. The support arm may be configured to be seated against the bottom end of the mounting portion.

In one aspect of the power distribution box assembly, the bracket includes an upper portion and a lower portion and a rib bounding a peripheral edge of the upper portion of the bracket, the weakening portion separating the upper portion from the lower portion.

In one aspect of the power distribution box assembly, the recessed wall is disposed along a plane that is angled with respect to the mounting portion. In such an aspect, the support arm includes a third hole configured to receive a clip for attaching the support arm to the bottom support wall of the mounting portion.

A bracket for attaching a connector to a power distribution box assembly is also provided. The bracket includes a main body having an inner surface and an outer surface, the main body further including an upper portion and a lower portion; a weakening portion configured to bend the lower portion relative to the upper portion; and a support arm extending orthogonal from the main body.

In one aspect of the bracket, the bracket further includes a rib extending outwardly from an outer surface of the main body and along the upper portion of the main body. The weakening portion separates the upper portion from the lower portion. In such an aspect, the support arm may be disposed on the inner surface of the main body and the main body is a planar member. The bracket may further include a neck portion disposed at a bottom of the upper portion and contiguous with the lower portion, wherein upper portion is longer than the lower portion, and the lower portion is wider than the upper portion.

Advantageous Effects

Accordingly, the power distribution box assembly is configured to distribute power to the vehicle and provide a structure for mounting a component and mitigating the damage to the electric components housed therein due to an impact.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed. Directional terms such as top, bottom, left and right are made in reference to the upright orientation of the drawings, and is indicated by directional arrows. The terms height, width, thickness and length are used in reference with the accompanying arrow.

Provided is a power distribution box assembly for supporting a wire harness assembly having a connector. The power distribution box assembly includes a lower cover, a bracket, and a clip. The lower cover includes a support wall having a mounting portion and a recessed wall disposed beneath the mounting portion. The bracket is configured to be attached to the mounting portion and is spaced apart from the recessed wall. The clip has a first end engaging both the mounting portion and the bracket so as to attach the bracket to the lower cover. The clip is configured to attach to the connector to the bracket, wherein upon impact of the connector, the bracket is deformed inwardly into the space defined by the recessed wall so as to prevent damage from occurring to components housed in the lower cover.

Figure 2:
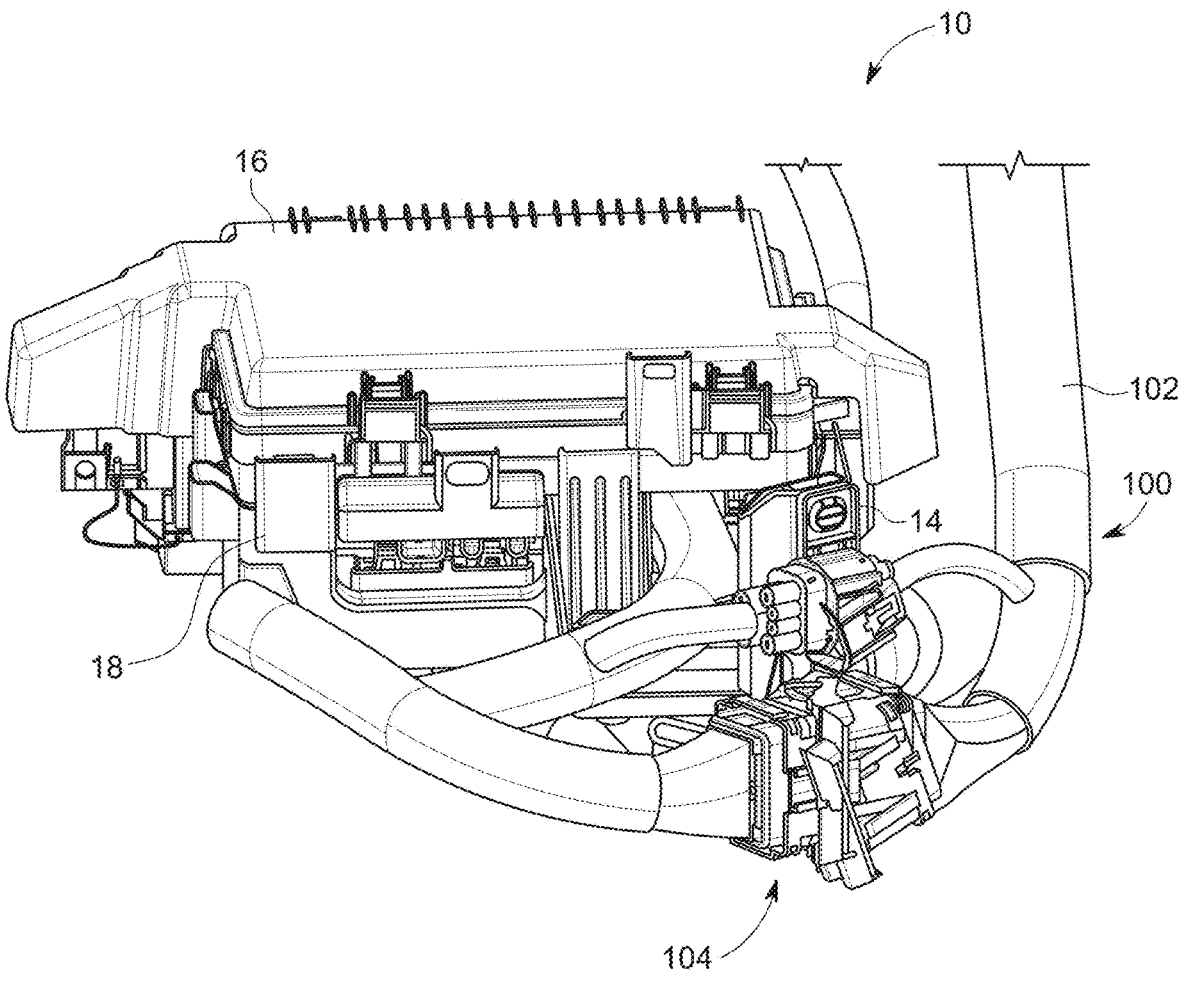
FIG. 2 is a perspective view of a power distribution box assembly according to one or more aspects described herein showing a wire harness attached to the lower cover.

With reference now to FIG. 2, a depiction of a power distribution box assembly 10 according to one or more aspects is provided. The power distribution box assembly 10 is illustratively shown being used in an automotive vehicle (not shown). The power distribution box assembly 10 may be formed of any material suitable for an injection molding process illustratively including polypropylene, Acrylonitrile butadiene styrene, polyoxymethylene, polycarbonate and the like. The power distribution box assembly 10 includes a power distribution box 12 and a bracket 14. The power distribution box assembly 10 is configured to house electronic components (not shown) for distributing power throughout the vehicle. The power distribution box assembly 10 is further configured to support a wire harness assembly 100. The wire harness assembly 100 includes a plurality of wires 102 that are electrically connected to each other by connector 104. The connector 104 is configured to attach to the power distribution box 12.

Figure 3:
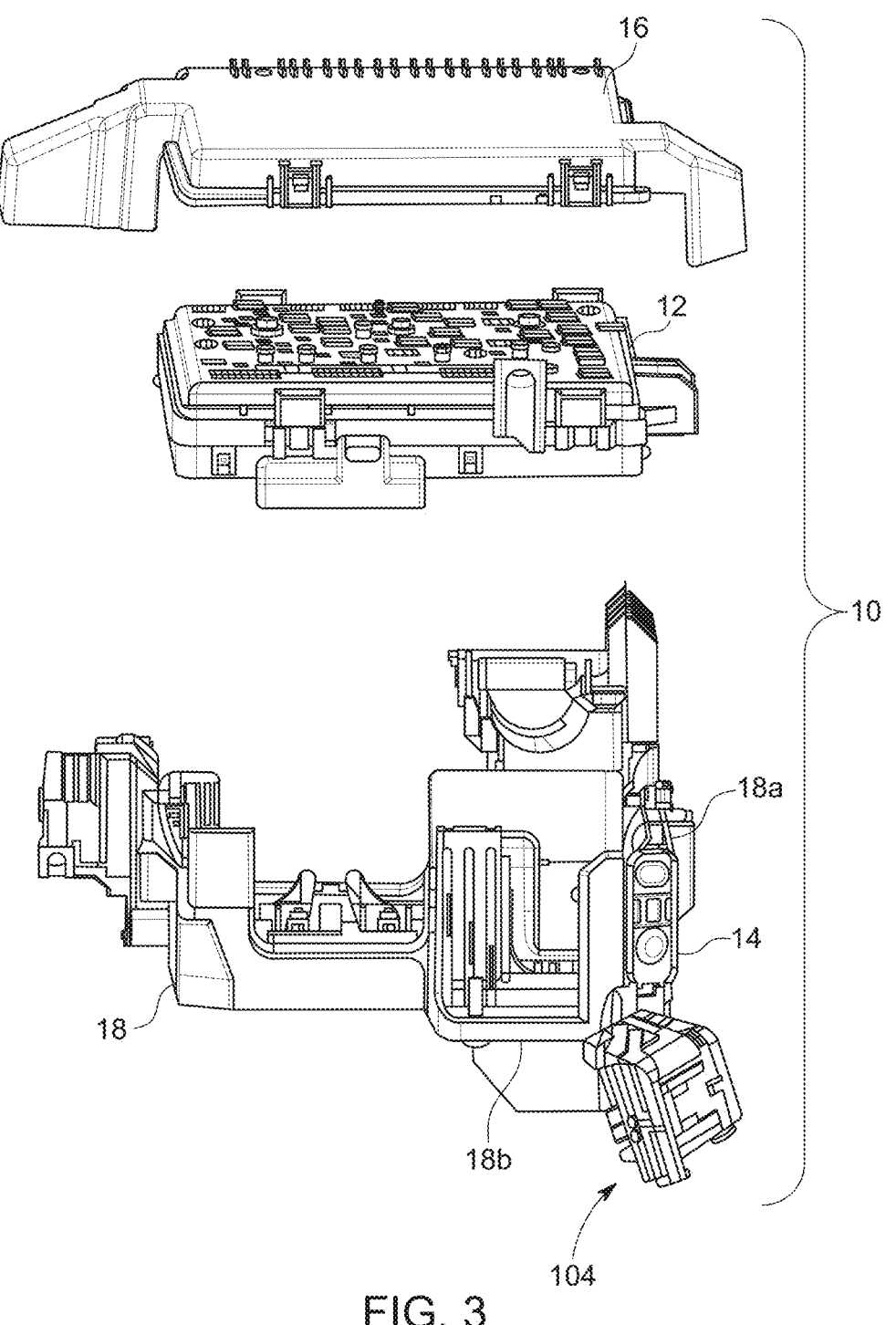
FIG. 3; is an exploded view of the power distribution box assembly with the connector attached to the bracket.

With reference now to FIG. 3, an exploded view of the power distribution box assembly 10 is provided showing the connector 104 attached. The power distribution box assembly 10 further includes an upper cover 16 and a lower cover 18. The upper cover 16 is configured to attach to the lower cover 18 using conventional fastening mechanisms such as a tab and slot. The upper cover 16 attaches to the lower cover 18 so as to enclose the power distribution box 12 therein. The bracket 14 is attached to an outer surface of the lower cover 18. The connector 104 is attached to the bracket 14.

Figure 4:
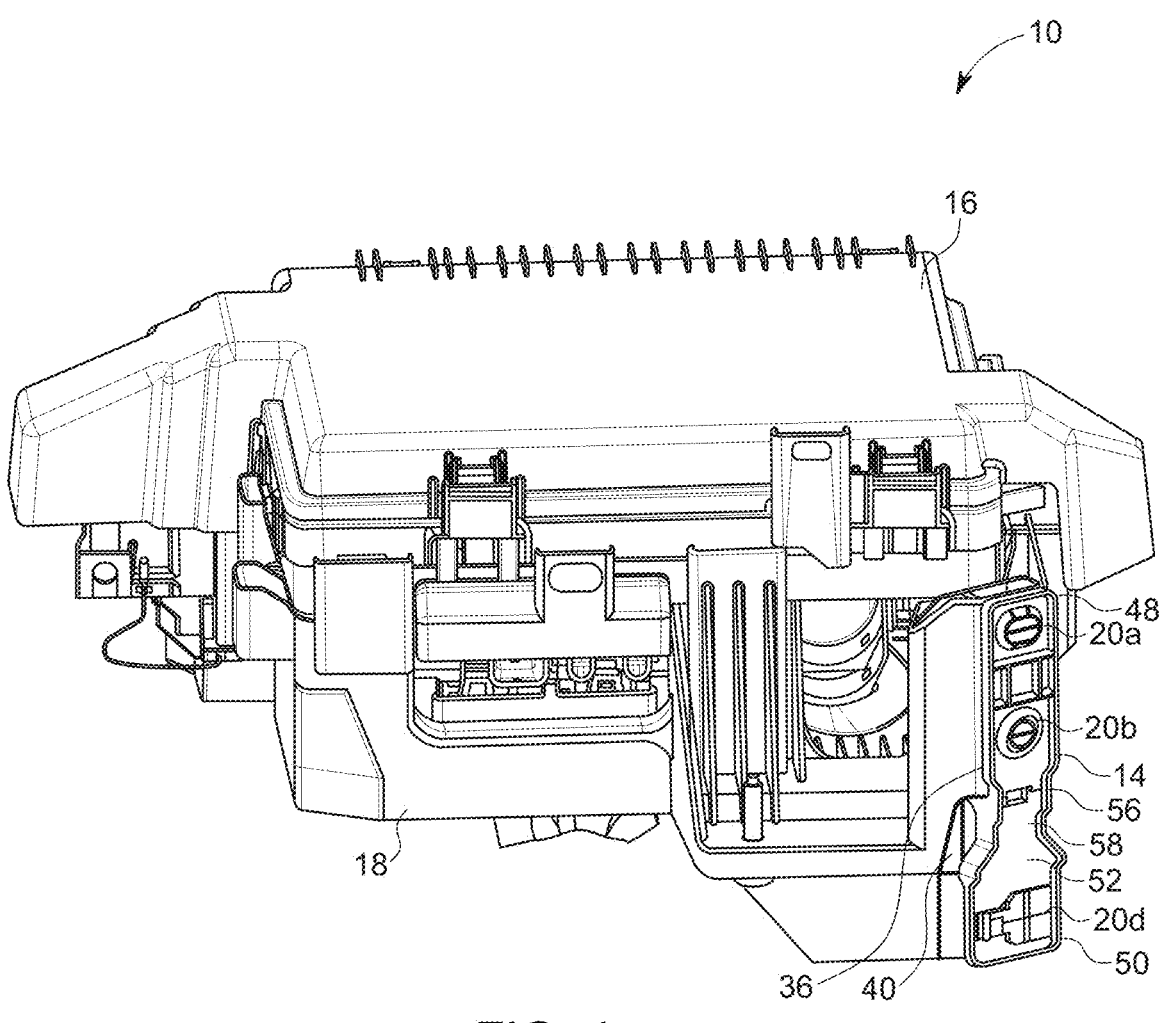
FIG. 4 is a perspective view of the power distribution box assembly with the connector removed.

With reference now to FIG. 4, the power distribution box assembly 10 further includes a plurality of clips 20. In particular, the power distribution box assembly 10 includes a plurality of mounting clips 20a, 20b, 20c configured to attach the bracket 14 to the lower cover 18 and a connector clip 20d for attaching the connector 104 to the bracket 14. The mounting clips 20a, 20b, 20c may be configured to secure the bracket 14 to the lower cover 18 using a press-fit engagement. The connector clip 20d may be configured to have a first end that engages the bracket 14 in a press-fit engagement and a second end that attaches to the connector 104.

Figure 5:
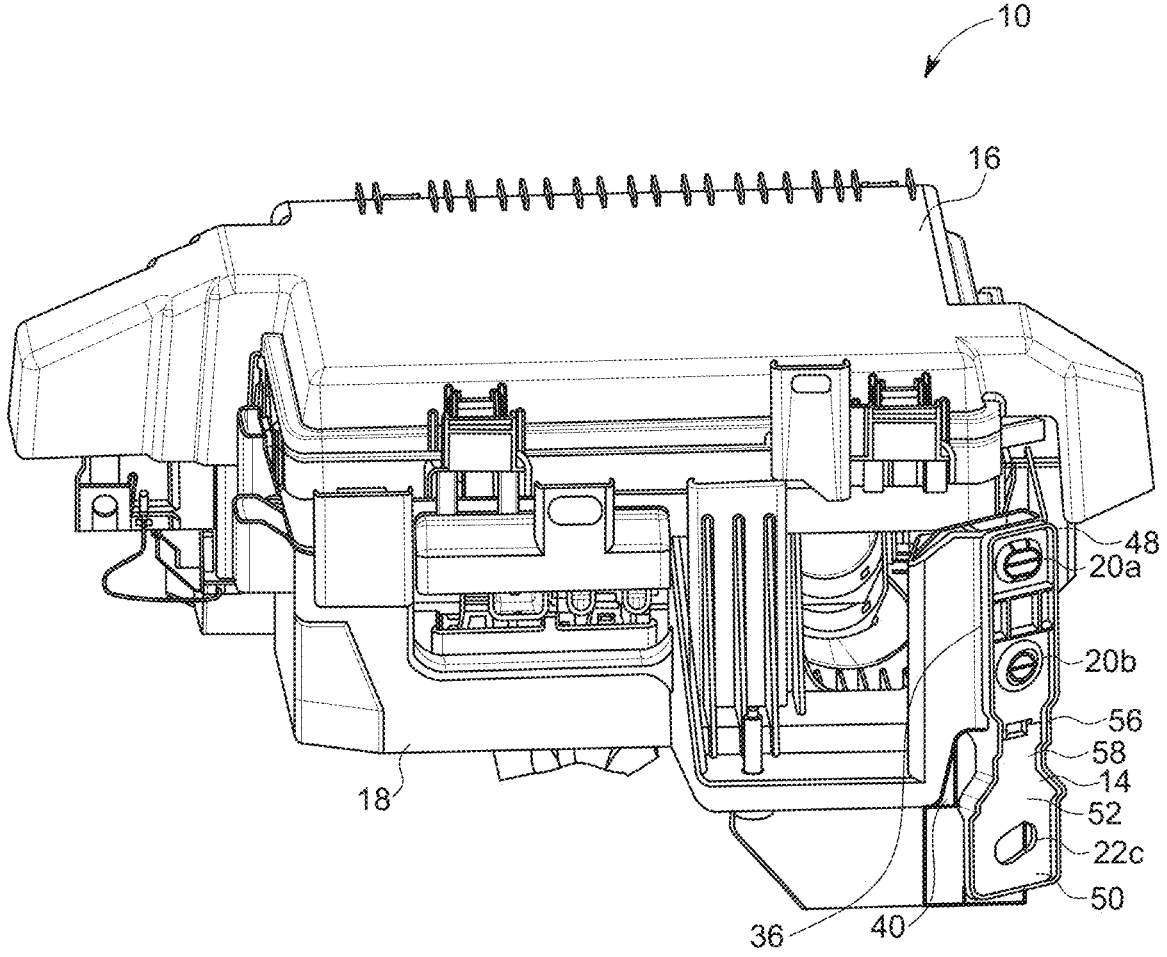
FIG. 5 is a view of FIG. 4 showing the clip removed from the bracket.
Figure 6:
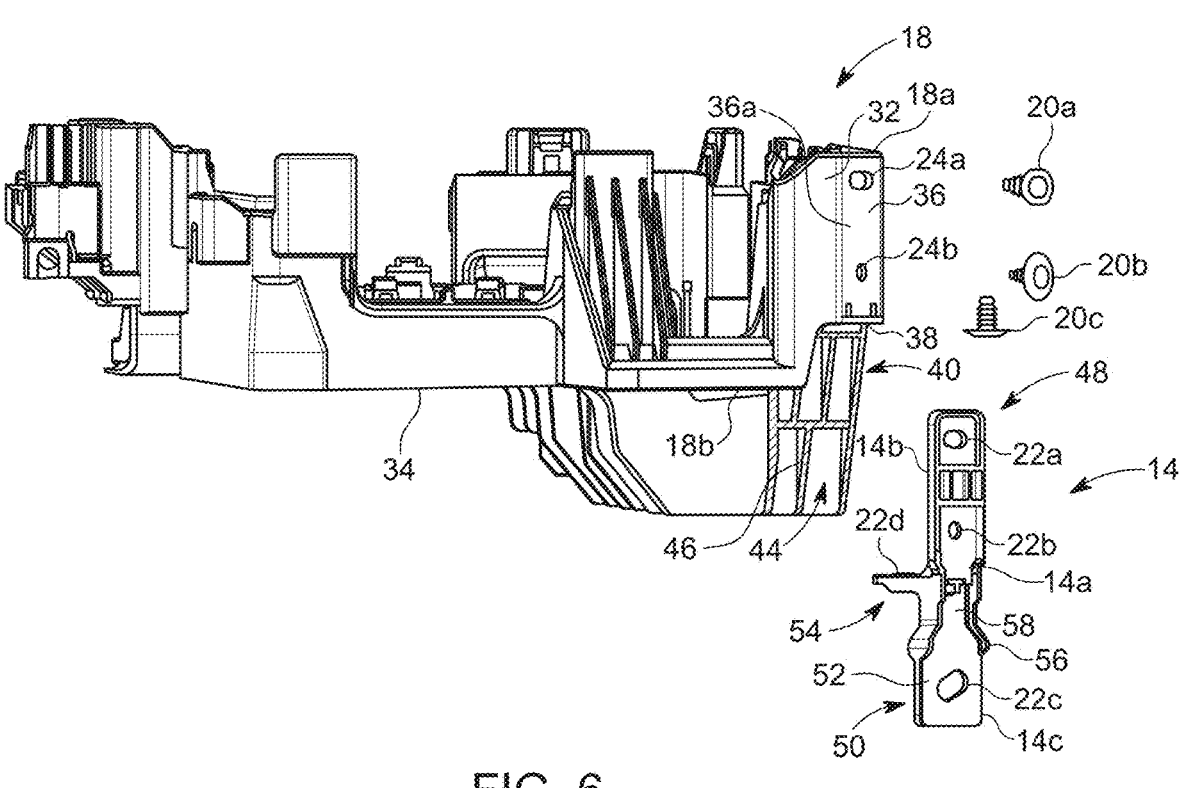
FIG. 6 is an exploded view of the lower cover and the bracket.

With reference now to FIGS. 5 and 6 a description of the bracket 14 and the clips 20a-20d is provided. The bracket 14 may be formed of a rigid and durable material such as steel. In such a case, the bracket 14 may a single piece formed from a stamping process. In other aspect, the bracket 14 may be resilient and formed from a polymer based material. In FIG. 5 the bracket 14 is shown attached to the lower cover 18 by a pair of mounting clips 20a, 20b, each mounting clip 20a, 20b may be different than the other. In particular, the mounting clips 20a, 20b are inserted into a pair of bracket holes 22a, 22b formed on the bracket 14 and mounting holes 24a, 24b disposed on the lower cover 18.

During assembly, the bracket 14 is mounted onto the lower cover 18 using the mounting clips 20a, 20b and the connector 104 is subsequently mounted to the bracket 14. With reference now to FIG. 6, the bracket 14 includes three bracket holes 22a, 22b, 22c. Two of the three bracket holes 22a, 22b are used to mount the bracket 14 to the lower cover 18 and bracket hole 22c is used to attach the connector 104 to the bracket 14. The bracket holes 22a, 22b, 22c may be shaped differently from each other to assist the assembly worker with using the appropriate clip 20a. 20b, 20d for a corresponding hole bracket hole 22a, 22b, 22c.

Figure 7:
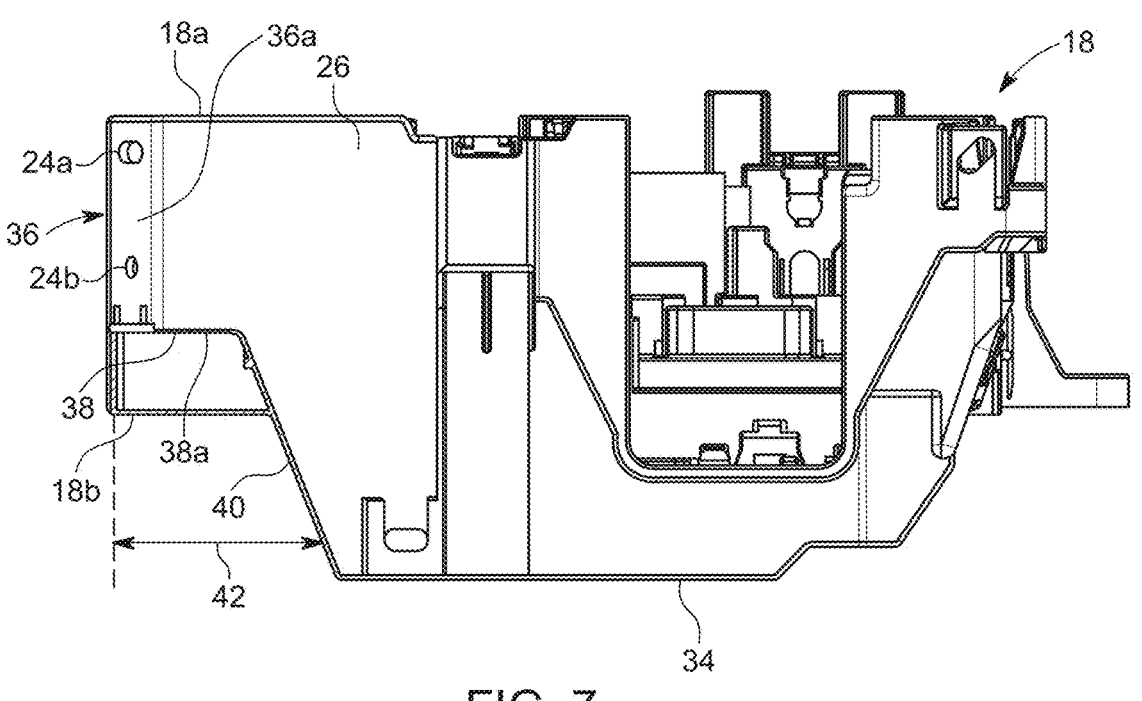
FIG. 7 is a side view of the lower cover showing the recessed wall.
Figure 8:
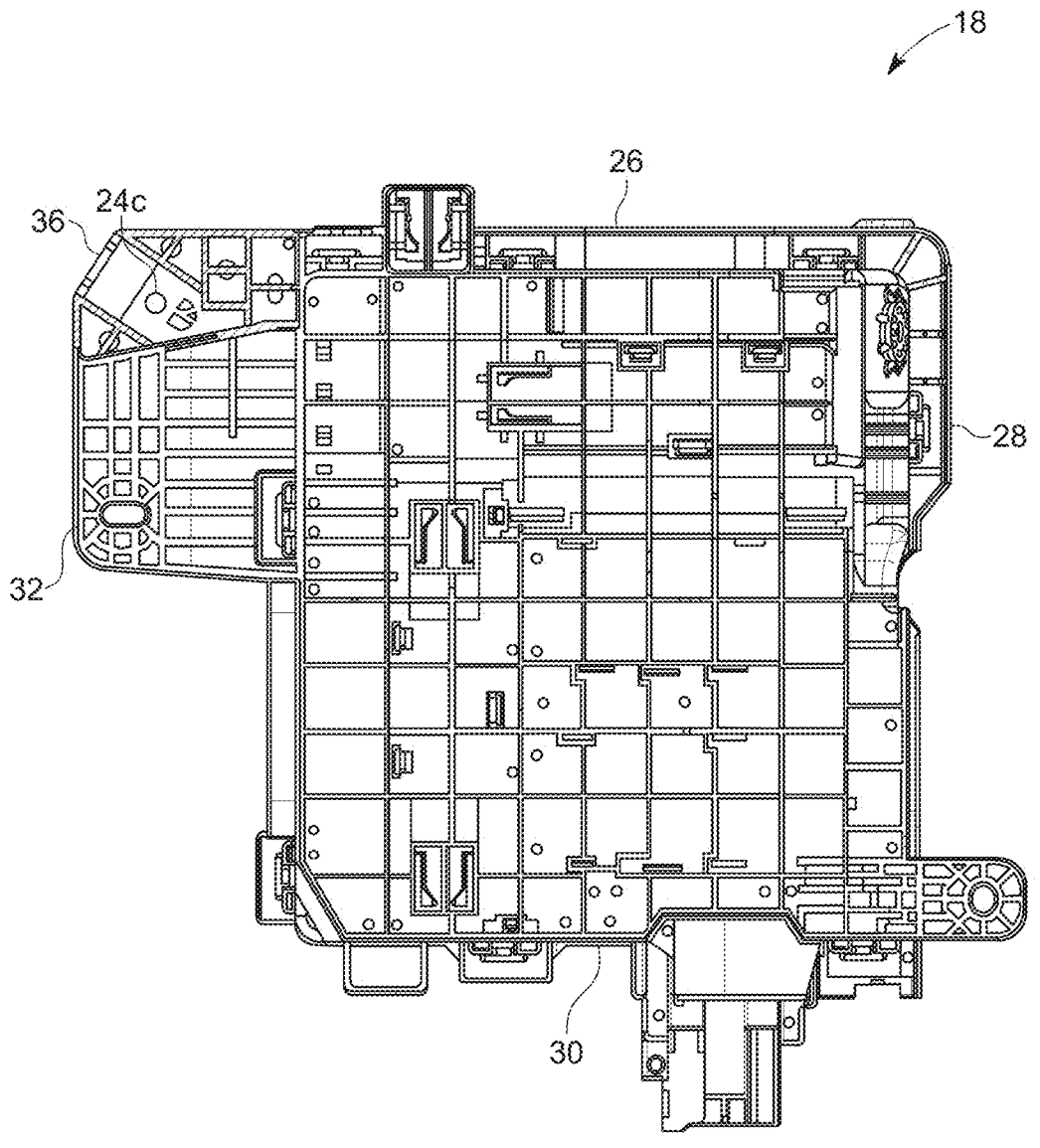
FIG. 8 is a bottom view of the lower cover.

With reference again to FIG. 6 and now to FIGS. 7 and 8, the lower cover 18 includes a first side wall 26, a second side wall 28, a third side wall 30, a fourth side wall 32 and a bottom wall 34 connected to each other to define a generally cuboidal housing having an open top. It should be appreciated that the first side wall 26, the second side wall 28, the third side wall 30 and the fourth side wall 32 define the sides of the lower cover 18 and need not be planar but may include protrusions and indentations to accommodate packaging demands of the electronic components and the packaging constraints of the automotive vehicle. The lower cover 18 may be formed of any material suitable for an injection molding process illustratively including polypropylene, Acrylonitrile butadiene styrene, polyoxymethylene, polycarbonate and the like. The first side wall 26, the second side wall 28, the third side wall 30 and the fourth side wall 32 may include openings for which wires 102 may be routed. The lower cover 18 depicted is provided for illustrative purposes and may be modified without deviating from the scope of the appended claims. For instance, the ribs disposed along the outer surface of the lower cover 18 may be modified or disposed on other areas of the lower cover 18.

The lower cover 18 further includes a mounting portion 36 disposed between one of the first side wall 26, the second side wall 28, the third side wall 30, and the fourth side wall 32 so as to define a corner of the lower cover 18. The mounting portion 36 includes a planar surface 36*a* extending from a bottom end 18*a* to a top end 18*b* of the lower cover 18. The lower cover 18 further includes a bottom support wall 38 disposed at a bottom of the mounting portion 36. The bottom support wall 38 includes a planar surface 38*a* that is generally orthogonal to the mounting portion 36. The bottom support wall 38 extends inwardly from an outer surface of the mounting portion 36. The bottom support wall 38 includes mounting hole 24*c* for receiving mounting clip 20*c* to secure the bracket 14 to the bottom support wall 38.

The lower cover 18 includes a recessed wall 40 that extends from one end of the bottom support wall 38 that is opposite of the mounting portion 36 so as to form a space 42 between an inner surface of the bracket 14 and the outer surface of the recessed wall 40. The recessed wall 40 is disposed along a plane that is angled with respect to the mounting portion 36. In particular, the recessed wall 40 is disposed on an end of the bottom support wall 38 that is opposite of the outer surface of the mounting portion 36 and extends downwardly relative to the mounting portion 36 and inwardly relative to the outer surface of the mounting portion 36. The recessed wall 40 extends from the bottom support wall 38 to the bottom wall 34 of the lower cover 18. The recessed wall 40 may include a plurality of gaps 44 separated from each other by a plurality of ribs 46.

With reference again to FIGS. 5 and 6, the bracket 14 includes a main body 14*a* having an inner surface 14*b* and an outer surface 14*c*. The main body 14*a* further includes an upper portion 48, a lower portion 50 and a weakening portion 52 configured to bend inwardly in response to an impact load. The weakening portion 52 may be disposed beneath the bottom end of the mounting portion 36 and separates the upper portion 48 from the lower portion 50. The bracket 14 may further include a support arm 54 extending orthogonally from an inner surface of the bracket 14. The inner surface is the surface seated onto the mounting portion 36. The support arm 54 may be configured to be seated against the bottom support wall 38 of the mounting portion 36. In particular, the support arm 54 includes a hole 22*d* and the bottom support wall 38 includes a hole 24*c*. Mounting clip 20*c* is configured to be seated into hole 22*d* and hole 24*c* so as to secure the support arm 54 to the mounting portion 36.

The bracket 14 may further include a rib 56 bounding a peripheral edge of the upper portion 48 of the bracket 14, the weakening portion 52 separating the upper portion 48 from the lower portion 50. In such an aspect, the rib 56 reinforces the upper portion 48 making the upper portion 48 more rigid relative to the lower portion 50 and thus weakening portion 52 is defined by where the rib 56 ends.

The bracket 14 may further include a neck portion 58 disposed at a bottom of the upper portion 48 and is contiguous with the lower portion 50. The rib 56 is formed along the neck portion 58 and ends at the lower portion 50. The lower portion 50 is a generally planar member having a flat smooth inner and outer surface. The neck portion 58 has a width that this smaller than a width of the upper portion 48 and the lower portion 50. The upper portion 48 is longer than the lower portion 50, and the lower portion 50 is wider than the upper portion 48. The upper portion 48 may have a length that is substantially equal to the height of the mounting portion 36.

To assemble the power distribution box assembly 10, the bracket 14 is positioned onto the mounting portion 36 by placing the upper portion 48 onto the mounting portion 36 and the support arm 54 against the bottom support wall 38 wherein the bracket holes 22*a*, 22*b* are aligned with the mounting holes 24*a*, 24*b* of the mounting portion 36 and the bottom support wall 38. Mounting clips 20 are then inserted into the holes of the bracket 14. The mounting clips 20 include a head portion and a shaft portion. In one aspect, the mounting clips 20 are formed of a resilient material wherein the shaft portion is a bulbous member configured to deform through the holes and expand when pushed past the holes to secure the bracket 14 to the mounting portion 36. In another aspect, the clips 20 include a threaded shaft configured to screw into the holes.

Once the bracket 14 is mounted to the mounting portion 36, the connector clip 20 is inserted into the connector hole of the lower portion 50. The connector 104 is than attached to the connector clip 20. It should be appreciated that one end of the connector clip 20 is configured to be fixedly attached to the connector hole and the other end of the connector clip 20 is configured to attach to the connector 104 by conventional means such as a tab and slot mechanism.

When mounted, the lower portion 50 of the bracket 14 positions the connector 104 away from the recessed wall 40. Thus, in the event of an impact in a direction indicated by the arrow shown in FIG. 2, the lower portion 50 is configured to bend inwardly a distance defined by the space 42 between the recessed wall 40 and the lower portion 50 of the bracket 14 so as to prevent the components within the lower cover 18 from being damaged by the impact.

Figure 1:
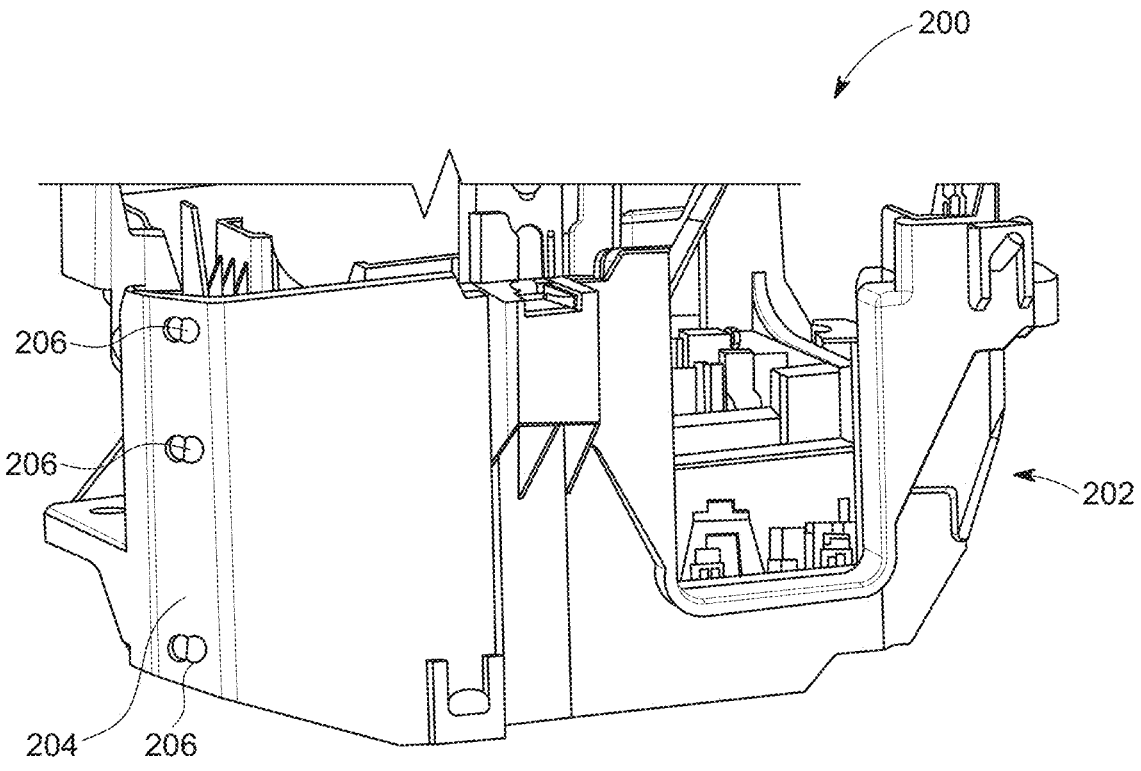
FIG. 1 is a perspective view of a conventional power distribution box assembly.

Accordingly, a power distribution box assembly is provided that is configured to distribute power to the vehicle and provide a structure for mounting a component and mitigating the damage to the electric components housed therein due to an impact. In operation, as the weakening portion 52 is disposed below the bottom of the mounting portion 36, the bottom of the mounting portion 36 presents an edge which promotes the inward bend of the bracket 14. Further, the support arm 54 of the bracket 14 is pressed against the bottom support wall 38 during an impact further promoting a bend along the weakening portion 52. It should be appreciated that conventional power distribution box assemblies shown in FIG. 1 has a mounting portion extending along an entire height of the lower cover and thus in the event the connector is impacted, the lower cover may be deformed and the components housed in the lower cover may be damaged. Thus, by placing the connector away from the lower cover, damage to the lower cover itself and components within the lower cover may be avoided.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power distribution box assembly for supporting a wire harness assembly having a connector, the power distribution box assembly comprising:

a lower cover having a support wall, the support wall including a mounting portion having a first hole;

a bracket configured to be attached to the mounting portion, the bracket including a second hole and a portion of the bracket is spaced apart from an outer surface of the lower cover; and a first clip configured to engage the second hole of the bracket so as to attach the connector to the bracket.

2. The power distribution box assembly according to claim 1, wherein the lower cover includes a recessed wall disposed at a bottom end of the mounting portion so as to form a space between an inner surface of the bracket and the outer surface of the recessed wall.

3. The power distribution box assembly according to claim 2, wherein the bracket further includes a weakening portion configured to bend.

4. The power distribution box assembly according to claim 3, wherein the weakening portion is disposed beneath the bottom end of the mounting portion.

5. The power distribution box assembly according to claim 4, wherein the lower cover includes a first side wall, a second side wall, a third side wall, a fourth side wall and a bottom wall connected to each other to define an open top.

6. The power distribution box assembly according to claim 5, wherein the mounting portion is disposed between one of the first side wall, the second side wall, the third side wall, and the fourth side wall.

7. The power distribution box assembly according to claim 6, wherein the mounting portion includes a planar surface extending from the bottom end to a top end.

8. The power distribution box assembly according to claim 7, wherein the bracket includes an attachment hole for receiving the first clip to attach the connector.

9. The power distribution box assembly according to claim 8, wherein the bracket includes a support arm.

10. The power distribution box assembly according to claim 9, wherein the support arm extend orthogonal from the inner surface of the bracket.

11. The power distribution box assembly according to claim 10, wherein the support arm is configured to be seated against the bottom end of the mounting portion.

12. The power distribution box assembly according to claim 11, wherein the bracket includes an upper portion and a lower portion and a rib bounding a peripheral edge of the upper portion of the bracket, the weakening portion separating the upper portion from the lower portion.

13. The power distribution box assembly according to claim 12, wherein the recessed wall is disposed along a plane that is angled with respect to the mounting portion.

14. The power distribution box assembly according to claim 13, wherein the support arm includes a third hole configured to receive a second clip for attaching the support arm to the bottom end of the mounting portion.

15. A bracket for attaching a connector to a power distribution box assembly, the bracket comprising:

a main body having an inner surface and an outer surface, the main body further including an upper portion and a lower portion, wherein the main body is a planar member;

a rib extending outwardly from the outer surface of the main body and along the upper portion of the main body;

a weakening portion configured to bend the lower portion relative to the upper portion;

a support arm disposed on the inner surface of the main body extending orthogonal from the main body, wherein the weakening portion separates the upper portion from the lower portion; and a neck portion disposed at a bottom end of the upper portion and contiguous with the lower portion, wherein the upper portion is longer than the lower portion, and the lower portion is wider than the upper portion.

16. A bracket for attaching a connector to a power distribution box assembly, the bracket comprising:

a main body having an inner surface and an outer surface, the main body being a planar member and further including an upper portion and a lower portion;

a rib extending outwardly from the outer surface of the main body and along the upper portion of the main body;

a weakening portion separating the upper portion from the lower portion and disposed on a distal end of the rib and configured to bend the lower portion relative to the upper portion about the distal end of the rib; and a support arm extending orthogonal from the main body.

* * * * *